No. 872,888. PATENTED DEC. 3, 1907.
A. BECCHI & G. B. TARANTINI.
APPARATUS FOR SUBMARINE RECOVERING OPERATIONS.
APPLICATION FILED NOV. 15, 1906.

6 SHEETS—SHEET 1.

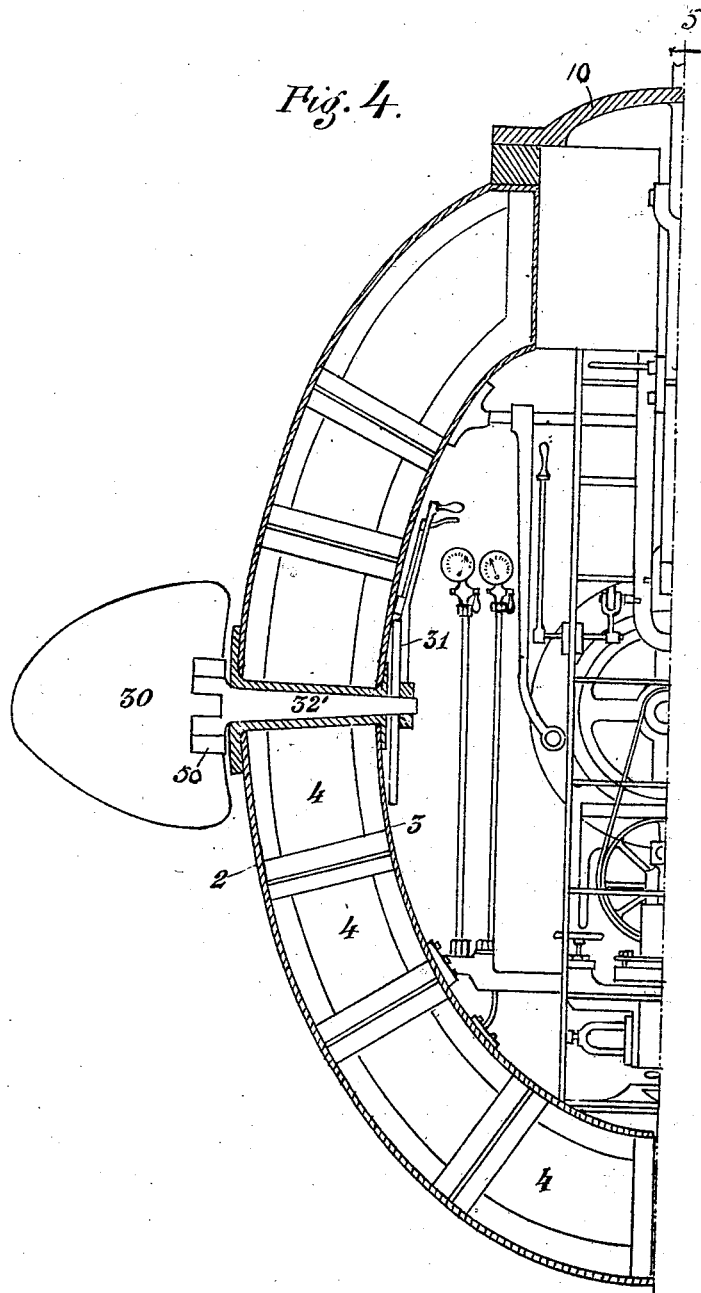

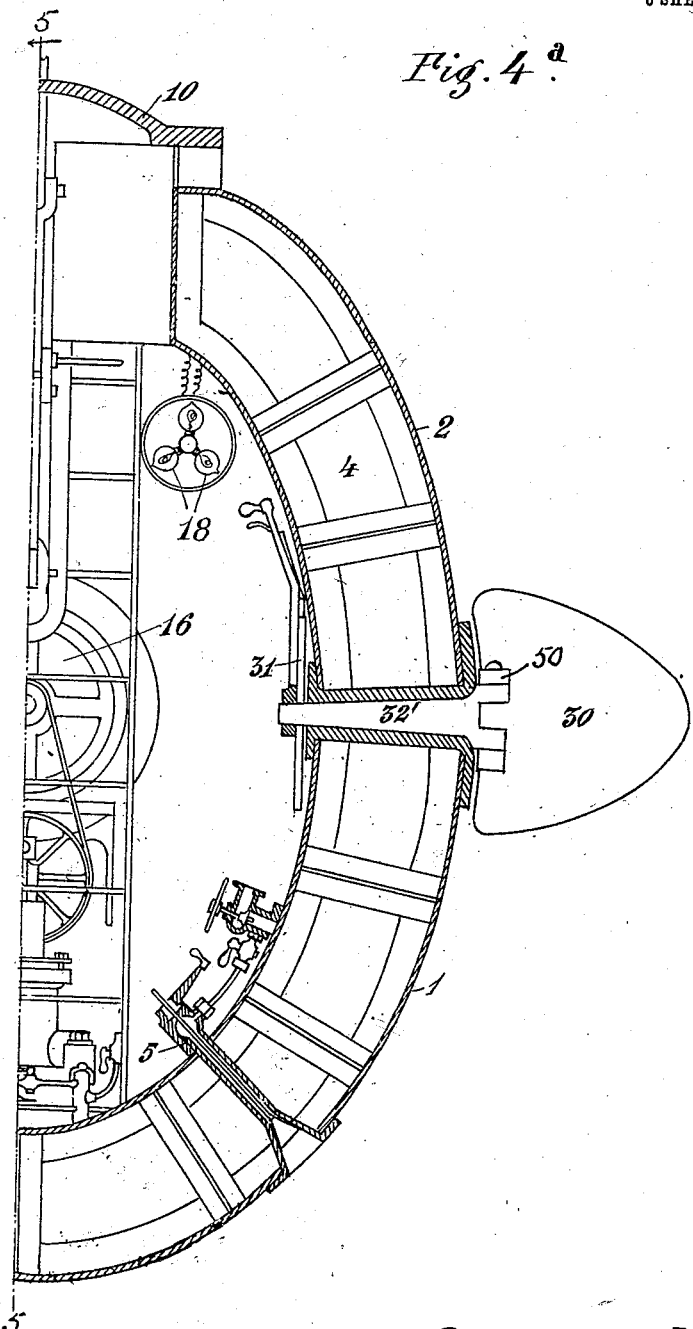

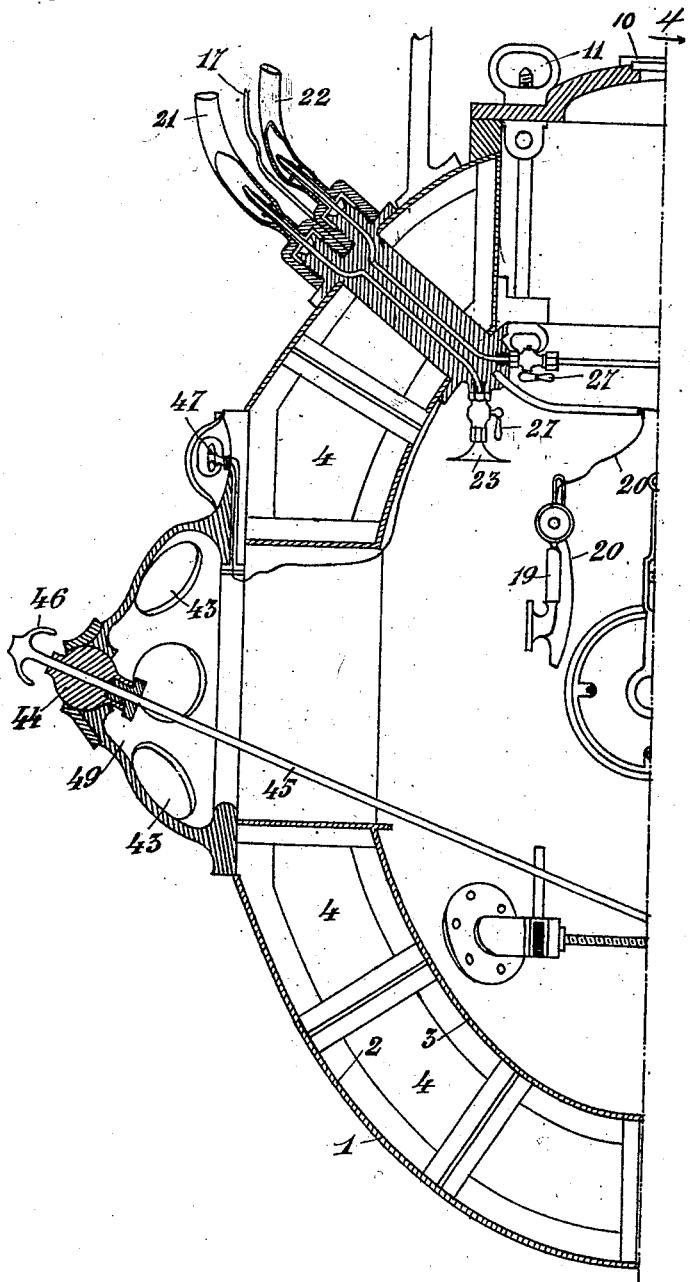

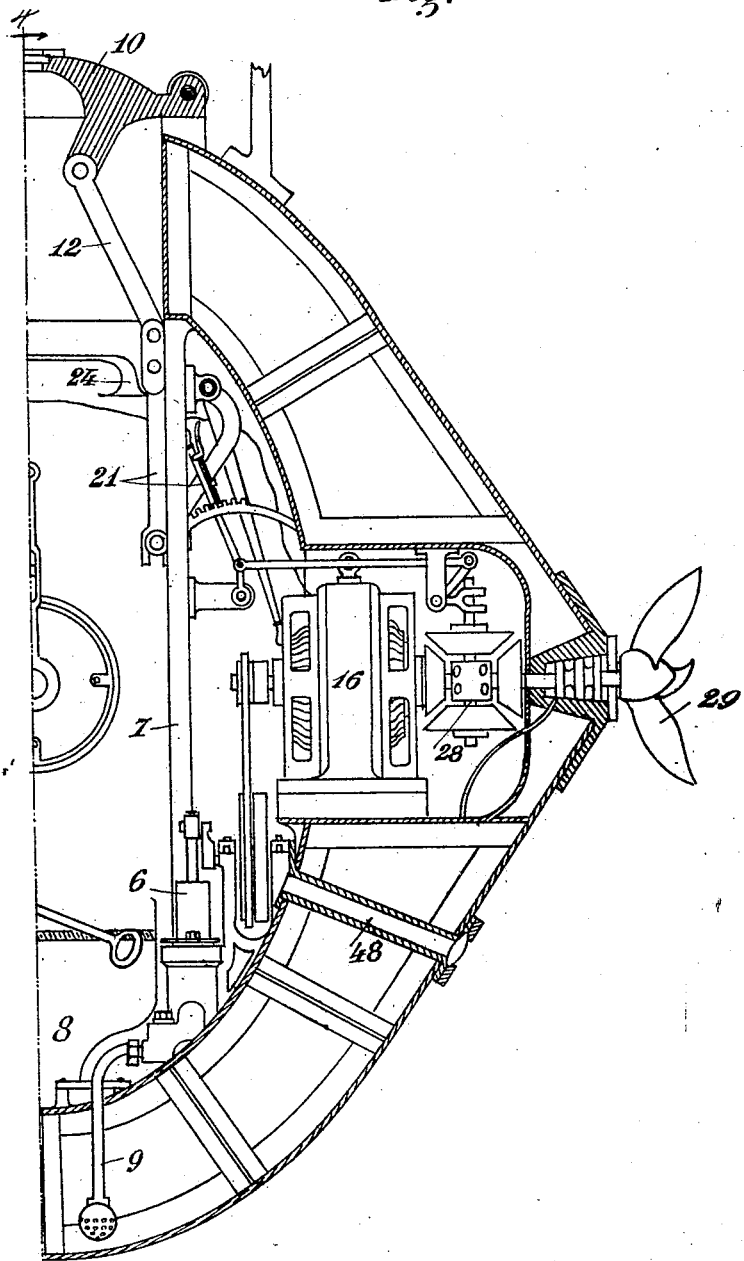

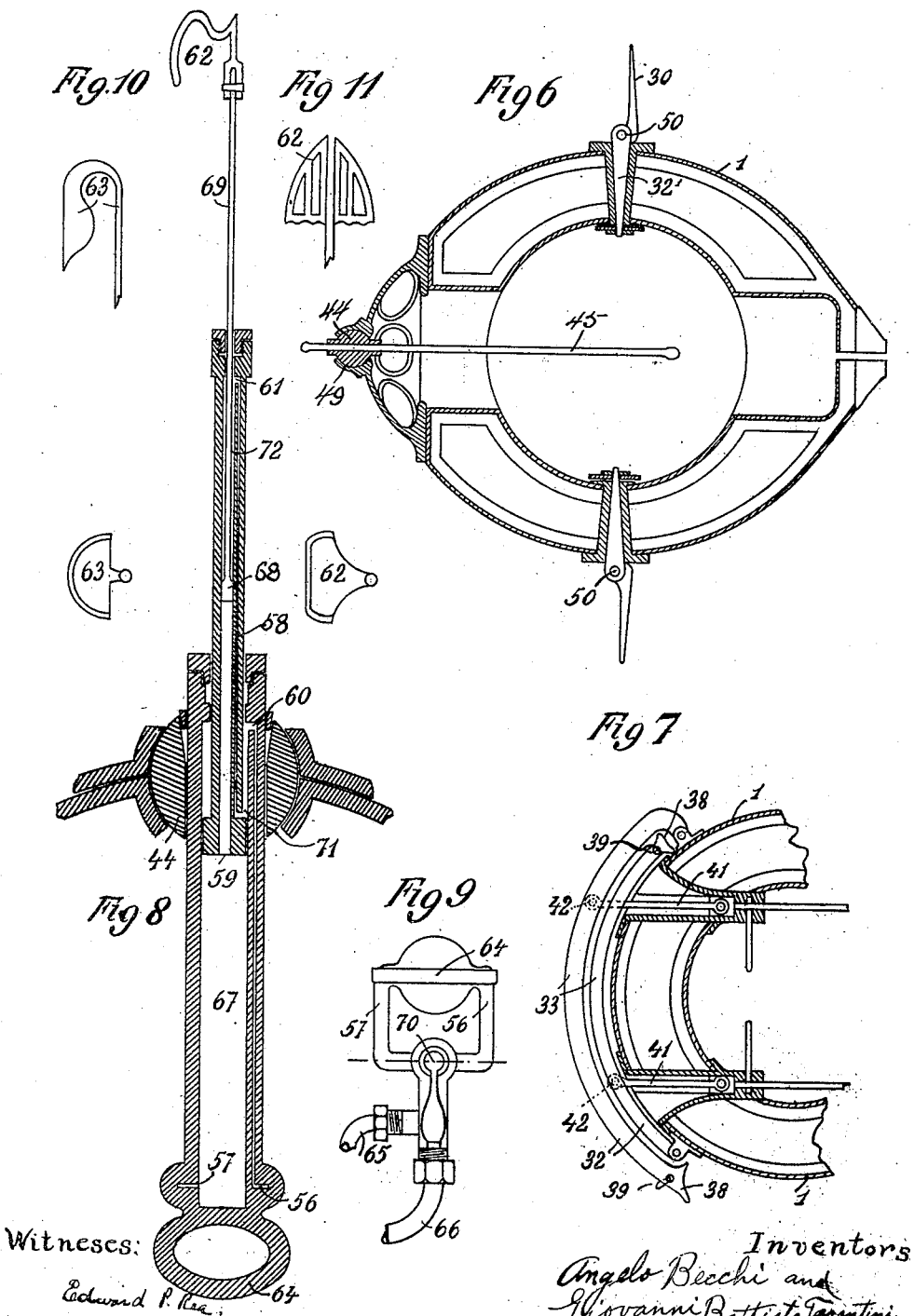

UNITED STATES PATENT OFFICE.

ANGELO BECCHI AND GIOVANNI BATTISTA TARANTINI, OF GENOA, ITALY.

APPARATUS FOR SUBMARINE RECOVERING OPERATIONS.

No. 872,888.

Specification of Letters Patent.

Patented Dec. 3, 1907.

Application filed November 15, 1906. Serial No. 343,646.

*To all whom it may concern:*

Be it known that we, ANGELO BECCHI, engineer, and GIOVANNI BATTISTA TARANTINI, sea captain, subjects of the King of Italy, and residents, respectively, of 8 Salita Battistina and of 9 Spianata di Castelletto, both in the city of Genoa, Province of Genoa, Kingdom of Italy, have invented new and useful Improvements in Apparatus for Submarine Recovering Operations, of which the following is a specification.

This invention has for its object to provide an apparatus for submarine recovering operations, for fishing of pearls, sponges, corals etc.

It consists of a submergible chamber movable forward and in every sense, as may be required for its operations. Said chamber is to be occupied by the operator and is internally furnished with all the necessary means for submarine inspections as well as for catching and holding the objects to be recovered or fished. These means are directed and managed by the operator on the inside of the chamber, but they act partially on the objects that are outside of it.

Figure 3:
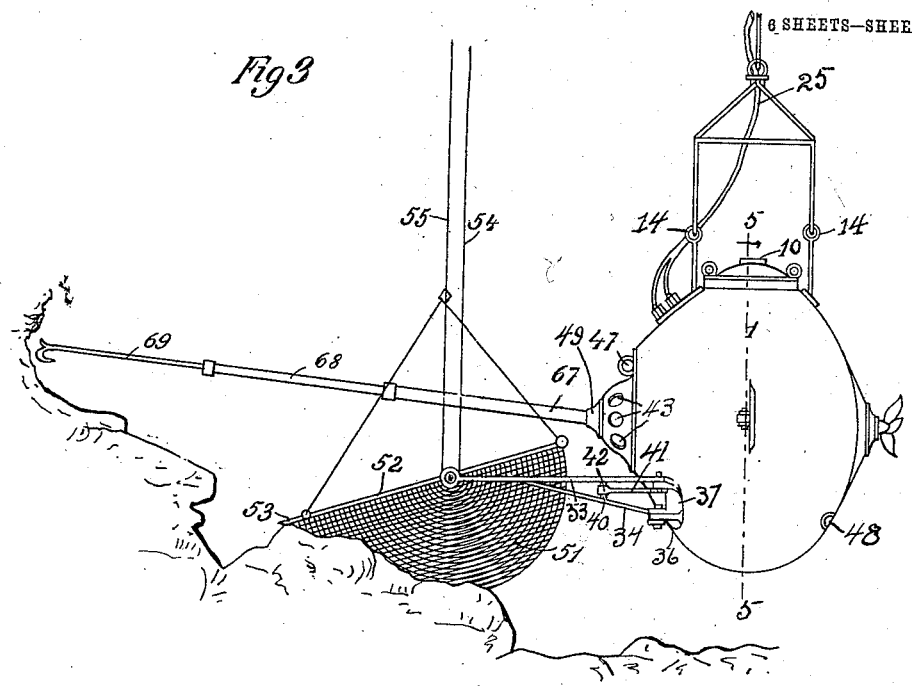
Figure 2:
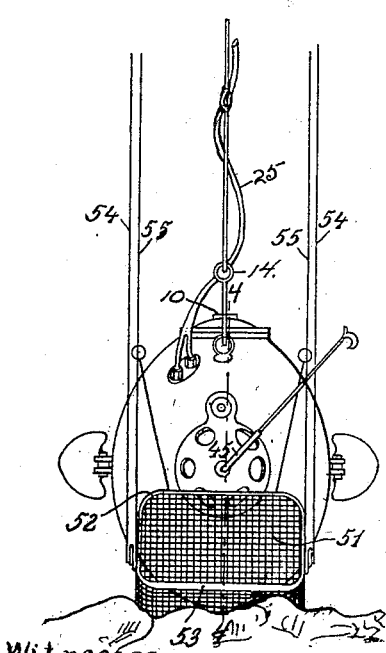
Figure 1:
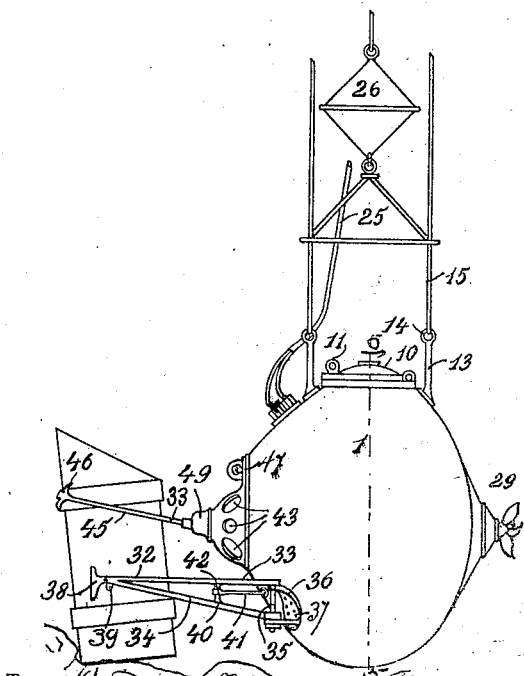

In the annexed drawings: Figure 1 shows the complete apparatus as seen from the outside with part of the cables used to suspend it from a vessel. Figs. 2 and 3 show the complete apparatus seen respectively from the front and side, furnished with the special accessories for sponges or corals fishing etc. Figs. 4 and 4ª together and Figs. 5 and 5ª together constitute two sectional elevations of this chamber, taken at a right angle to each other. Fig. 6 is a partial sectional elevation of the chamber, without the internal mechanisms, Fig. 7 shows a detail of the wall of the chamber with one of its arms or recovering cranes. Figs. 8 and 9 show the details of the articulated arm, that is provided and adapted to the apparatus when employed for fishing, Figs. 10 and 11 show different types of working points to be adapted to the top of said movable arm.

The chamber (Figs. 4 and 5) of the apparatus has an ovoidal form and is constituted by the double walls 2 and 3 so as to leave between them the compartments 4 that may be filled partially or entirely with water by means of the Kingston valve —5— or emptied by means of pump —6— which will throw the water outside of the chamber through tube —7—. Said pump —6— may also be used to drain the water introduced purposely or by chance in space —8— of the chamber. In order to effect this it will be only necessary to place the suction pipe —9— into said space —8—, instead of placing it inside of compartment —4—. The pump will be motioned by the electric motor hereinafter described, but it may be stopped without stopping the motor by passing the belt on the loose wheel as known.

The pump as well as the Kingston valve are used to raise or to lower the apparatus by increasing or diminishing the quantity of water contained in the compartments.

In its upper part, the chamber —1— is furnished with a door —10—: this can be opened from the outside by means of handle —11— or from the inside through the action of lever —12—. There are also two bars —13— furnished with the rings —14— to which are fastened the cables —15— that go vertically up to the deck of a ship, not shown in the drawings. Inside of the chamber there is an electric motor —16— that receives the necessary current from an electric battery placed on the ship: this battery furnishes also the current to light the apparatus, —17— for the submarine explorations, and the lamps —18— placed inside of chamber —1—. The apparatus is also furnished with a telephone —19— connected to the ship by the conductors —20— and finally there are two tubes or pipes —21— and —22— going from the ship to the apparatus the one —21— for injecting pure air into the chamber and the other —22— for suctioning the foul air from it. These pipes terminate respectively inside of the chamber at the muzzles 23 and 24 and are furnished with the cocks —27— also in the interior of the chamber. All the aforesaid conductors and pipes are united in one single bundle —25— supported by the small buoy —26— at the sea surface.

The electric motor —16— works the gear —28— that actuates the screw —29— and said gear is made in such a way that the movement of the propeller can be reversed.

At two points of the greater circular section of the chamber and diametrically opposed to each other are placed the paddles —30— which by means of the handles —31— and of the bars —32— may take various positions in the water in which they are immersed. When the propeller —29— is in motion these paddles act as a rudder and according to their position direct the apparatus not only in its rotation on its proper vertical axis but also in its ascending or descending movement and specially for the latter. These movements are previously agreed upon between the operator and the assistants who are on board of the ship. This agreement can be made by means of the telephone. When the apparatus is not working the paddles are folded against the wall of the chamber, such folding being permitted by means of the hinges —50—.

About the lower part of the chamber and on the outside of it are the two cranes —32— each consisting of a horizontal bar —33— and of a supporting bar —34— connected through the upright —35— by means of which each crane may rotate horizontally in the hinges —36— that form part of the supporting plate —37— that is fastened on the wall of the apparatus on the outside of it. Each crane is furnished with an enlargement at the head —38— near this is a ring —39—. The cranes are shaped like the arc of a circle so that they may be folded against the chamber and fit exactly on its outside casing.

Each crane has a crosspiece —40— in its central part, on this turns the eye —42— connected to bar —41—: this goes through the double wall of the apparatus and is furnished with water tight fittings, it enters the chamber far enough to allow the operator to manage it handily so as to regulate the position of the crane according to the operations that should be performed.

Above the two cranes and on the meridian plane between the two supports —37— is the nipple —49—. It is furnished around its center with the large openings —43— closed by thick plates of glass with airtight fittings at the joints. Through these the operator can look out from the inside: immediately above this nipple is placed the electric search-light —47— that lights the submarine space where the searching and eventual recovering operations are to be performed. Other openings for looking outside may be provided in any part properly chosen: for example: at —48—. In the center of the nipple —49— turns free the ball —44— in a spherical bearing which remains perfectly tight during all its movements, so that the water can never filtrate into the chamber. In the direction of a diameter of said ball, runs bar —45— furnished with the hooks —46— at its end.

The apparatus works as follows: After being transported by a ship where wanted, it will be lowered into the water. By means of the electric motor, the Kingston valve the pump, the propeller and the rudder-paddles, the apparatus moves in the liquid space and the operator searches for the materials to be recovered, by looking through the glass of the openings —43— aided by the light of the electric search-light. The operator is always in telephonic communication with the assistants on the ship. The internal light and the continual renovation of the air inside of the chamber provide for the comfort and for the hygienic exigencies of the operator.

When the apparatus is employed for submarine recovering operations, the operator looking through the holes 43 and working the bars —41— and —45— letting the whole apparatus turn and move in whatever sense he requires, can get a hold on the object that is to be recovered, either with one or with both cranes, then he will give the signal to the ship to raise the apparatus and with it also the recovered object.

The weight and the dimensions of the apparatus are calculated, so that by its complete immersion and its compartments being empty it should raise one ton of weight.

When the apparatus is to be employed for fishing sponges etc., the arm —45— is substituted by another one shown in Figs. 8 and 9. This arm consists of two, three or four steel pipes telescoped into each other, the most internal one contains a bar of steel furnished at its end with a special shovel, that may be changed according to the different kind of fishing that is to be done. Said arm is in constant communication with a pump by means of a flexible pipe —66— another pipe —65— serves to let the water out of the arm, after it has worked in it. A cock —70— will, according to its position, (1st) establish the communication between the water feeding pipe —66— and canal —57—, or (2nd) connect pipe —66— with canal —56— and at the same time connect pipe —65— with canal —57— or else (3rd) close any connection between pipe —66— and the inside of the arm. When the water under pressure arrives through canal —57— it will push the pistons —59— —68—, with which the extremities of the telescoped steel pipes are provided and compel the pipes to slide out of each other, thus extending the arm forward, outside of the apparatus. When wishing to shorten this arm, the operator turns the cock —70— letting thus enter the water under pressure into canal —56—, it will then flow through pipe —60— into the space —71— into canal —58— and from this pass through the hole —61— into the space —72—. In the spaces —71— and —72— the water under pressure acting on the opposed face of the pistons —59— and —68— will push them back and the water that is on the other side of the pistons will run from cylinder —67—, and pipes —65— the connection with said pipe, being controlled by the position of cock —70—. By means of this movement that extends or shortens this arm, it will be easy to pluck off, wrest and detach the various objects, as sponges, coral etc., to be fished and it will be easy also to bring the operating point of the arm to the place and point required.

In order to gather the objects fished in this manner the apparatus may be furnished with a net attached to an iron hoop, held by the two ropes —54— and —55—, that pass through two rings fastened at the top of the arms or cranes —32— —32—. The two ropes —54— and —55— will permit to raise and to lower the net, so that it may be brought to the surface in order to empty it and again lower it to the bottom of the sea without raising and lowering every time the whole apparatus: which operation would cause the losing of much time and eventually of the good spot for rapid and successful fishing.

When the chamber is used for fishing purposes, it is advisable to line its outside with a soft wood casing in order to protect it against the effects of eventually striking against the rocks.

No matter whether the apparatus is employed for recuperations or for fishing, it always offers the following advantages, i. e.

(a) It is furnished with double bottom and walling, this, besides serving to raise and to lower the apparatus itself allows to largely diminish the thickness of the sheeting, so as to render the apparatus very light while conserving through its cellular form a great resistance to external pressure that is considerable in the great depths of the water.

(b) It is of rather small dimensions in relation of the work it is required to perform, which renders easy its being raised and lowered by a ship at the surface, and reduces the cost of the apparatus.

(c) It possess a great mobility of its own in all directions, including its raising and lowering by means of the propeller of the paddles, the pump and the Kingston valve.

(d) It is furnished with powerful means for recuperations, because the two cranes designed for this work can resist to the effort, in grasping, of 20 tons, it should be also noted that the rings applied to the ends of the bars may be connected with strong cables fastened on board of the ship and these may aid the apparatus, when necessary, to raise objects of an exceptional weight.

(e) It is furnished when used for fishing sponges or corals, etc., with a movable arm that has a large range of action and which is capable of regular efforts without shocks at its extremity.

(f) It is furnished when used for fishing sponge or coral or the like with a net fastened in such a way, that when it is full it may be easily raised to the surface and lowered again without being compelled to raise the whole apparatus.

Having now particularly described the nature of our said invention we declare that what we claim is:

1. An apparatus for submarine recovering and fishing operations, provided with an external arm handled from the inside by the operator and with cranes adapted to hold the submerged objects to be recovered.

2. An apparatus for submarine recovering and fishing operations consisting of an outer casing of an ovoidal form, provided with a suitable propeller, motioned from inside, and with two rudder blades, at two diametrically opposed points of the outer casing and means permitting the folding of the rudders against the sides of the casing.

3. An apparatus for submarine recovering and fishing operations provided with two outside cranes, which from inside, by means of suitable bars, passing through water tight fittings of the outer casing may be turned on suitable pivots and folded against the chamber casing, owing to their curved shape.

4. In a device of the class described, a shell, derrick arms extending outwardly from the shell, a receptacle suspended from the derrick arms, and means to introduce material into the receptacle.

5. In a device of the class described, a shell, derrick arms extending outwardly from the shell, a receptacle suspended from the derrick arms, means within the shell for operating the derrick arms, means to introduce material into the receptacle, and means to move the shell.

6. In a device of the class described, a shell, derrick arms extending outwardly from the shell, a receptacle supported by the derrick arms, means within the shell for manipulating the derrick arms, and means operable from within the shell for introducing material into the receptacle.

7. In a device of the class described, a shell, derrick arms extending outwardly from the shell, a receptacle suspended from the derrick arms, a telescoping arm extending outwardly from the shell above the receptacle, means to move the sections of the telescoping arms.

8. In a device of the class described, a shell, derrick arms extending outwardly from the shell, a receptacle suspended from the derrick arms, a telescoping arm extending outwardly from the shell of the receptacle, means to move the sections of the telescoping arm longitudinally, and means within the shell for moving the telescoping arm angularly upon the receptacle.

Signed by us at Genoa this 5th day of November, 1906.

ANGELO BECCHI.
GIOVANNI BATTISTA TARANTINI.

Witnesses:
ANGELO PORAENIA,
C. B. PEDEVILLO.